(12) United States Patent
Aoyama et al.

(10) Patent No.: US 8,414,428 B2
(45) Date of Patent: Apr. 9, 2013

(54) MOLD FOR A GOLF BALL

(75) Inventors: Steven Aoyama, Marion, MA (US);
Nicholas M. Nardacci, Bristol, RI (US);
Michael R. Madson, Pawtucket, RI (US); David P. Hunt, Taunton, MA (US)

(73) Assignee: Acushnet Company, Fairhaven, MA (US)

( * ) Notice: Subject to any disclaimer, the term of this patent is extended or adjusted under 35 U.S.C. 154(b) by 390 days.

(21) Appl. No.: 12/755,605

(22) Filed: Apr. 7, 2010

(65) Prior Publication Data

US 2010/0197428 A1 Aug. 5, 2010

Related U.S. Application Data

(60) Continuation-in-part of application No. 12/199,822, filed on Aug. 28, 2008, now abandoned, which is a division of application No. 11/273,175, filed on Nov. 14, 2005, now abandoned, which is a continuation-in-part of application No. 10/797,796, filed on Mar. 10, 2004, now Pat. No. 7,422,529.

(51) Int. Cl.
*A63B 37/12* (2006.01)

(52) U.S. Cl.
USPC .......................................... 473/383

(58) Field of Classification Search ........... 473/379–385
See application file for complete search history.

(56) References Cited

U.S. PATENT DOCUMENTS

| | | | |
|---|---|---|---|
| 2,361,348 A | 10/1944 | Dickson et al. | |
| 2,787,024 A | 4/1957 | Smith | |
| 4,653,758 A | 3/1987 | Solheim | |
| 4,960,282 A | 10/1990 | Shaw | |
| 5,087,049 A | 2/1992 | Yamagishi et al. | |
| 5,123,652 A | 6/1992 | Oka | |
| 5,201,523 A | 4/1993 | Miller | |
| 5,249,804 A | 10/1993 | Sanchez | |
| 5,407,341 A | 4/1995 | Endo et al. | |
| 5,688,193 A | 11/1997 | Kasasima et al. | |
| 5,688,194 A | 11/1997 | Stiefel et al. | |
| 5,700,406 A | 12/1997 | Menhennett et al. | |
| 5,801,709 A | 9/1998 | Suzuki et al. | |
| 5,812,402 A | 9/1998 | Nishiyama et al. | |
| 5,827,135 A | 10/1998 | Shimosaka et al. | |
| 5,840,351 A | 11/1998 | Inoue et al. | |
| 5,874,038 A | 2/1999 | Kasashima et al. | |
| 5,899,822 A | 5/1999 | Yamagishi et al. | |
| 5,947,844 A | 9/1999 | Shimosaka et al. | |
| 6,123,534 A | 9/2000 | Kasashima et al. | |
| 6,168,407 B1 | 1/2001 | Kasashima et al. | |
| 6,632,078 B2 | 10/2003 | Ogg et al. | |
| 6,644,948 B2 | 11/2003 | Mydlack et al. | |
| 6,682,442 B2 | 1/2004 | Winfield | |
| 6,685,456 B2 | 2/2004 | Sajima | |
| 6,719,647 B2 | 4/2004 | Sajima | |
| 6,917,905 B2 | 7/2005 | Asano et al. | |
| 7,431,670 B2 | 10/2008 | Nardacci et al. | |
| 7,618,333 B2 | 11/2009 | Nardacci et al. | |
| 2006/0068931 A1 | 3/2006 | Aoyama | |

*Primary Examiner* — Raeann Gorden

(74) *Attorney, Agent, or Firm* — D. Michael Burns

(57) ABSTRACT

A golf ball mold having a non-planar parting surface formed by superimposing a base waveform with a least one shorter secondary waveform. The base waveform is defined by a series of concentric arcs wherein adjacent arcs are connected with a straight line segment that is tangent to the arcs and creates an acute angle. The length of the straight line segment being critical to the accuracy and predictability of the parting line.

29 Claims, 13 Drawing Sheets

MOLD FOR A GOLF BALL

This application is a continuation-in-part of U.S. application Ser. No. 12/199,822 which filed Aug. 28, 2008 now abandoned, which is a divisional of U.S. application Ser. No. 11/273,175 which was filed Nov. 14, 2005, now abandoned, which is a continuation-in-part of U.S. application Ser. No. 10/797,796 filed on Mar. 10, 2004, and is now U.S. Pat. No. 7,422,529 and is incorporated herein in its entirety by express reference thereto.

FIELD OF THE INVENTION

The invention relates in general to an improved golf ball mold having a non-planar parting surface used to manufacture "seamless" golf balls, and more particularly, to a method for designing the non-planar parting line of the mold.

BACKGROUND OF THE INVENTION

The usual golf ball manufacturing techniques include several different steps, depending on the type of ball, such as one, two, three or even more than three piece balls. According to the traditional method, a solid or composite elastomeric core is made, and an outer dimpled cover is formed around the core.

The two standard methods for molding a cover over a core or a core and inner layers are compression molding and injection molding. Compression molding is accomplished by using a pair of hemispherical molds each of which has an array of protrusions machined or otherwise provided in its cavity, and those protrusions form the dimple pattern on the periphery of the golf ball during the cover molding operation. A pair of blanks, having a hemispherical shape, are placed in diametrically opposed positions on the golf ball body, and the body with the cover blanks thereon are placed in the hemispherical molds, and then subjected to a compression molding operation. The combination of heat and pressure applied during the molding operation results in the cover blanks being fused to the golf ball body and to each other to form a unitary one-piece cover structure which encapsulates the golf ball body. In addition, the cover blanks are simultaneously molded into conformity with the interior configuration of the hemispherical molds which results in the formation of the dimple pattern on the periphery of the golf ball cover. When dimple projections are machined in the mold cavity they are typically positioned below the theoretical parting line of the resulting mold cavity. The parting line is typically machined after the dimple forming process.

For ease of manufacturing the parting line on the cavity is machined flat and perpendicular to the dimpled surface as to provide a positive shut off preventing flowing cover material from leaking out of the mold. This dimple positioning and flat parting line results in a great circle path on the ball that is essentially void of dimples. This is commonly referred to as the equator, or parting line, or seam of the ball. Over the years dimple patterns have been developed to compensate for cosmetics and/or flight performance issues due to the presence of the seam.

As in all molding operations, when the golf ball is removed from the hemispherical molds subsequent to the molding operation, it will have molding flash, and possibly other projecting surface imperfections thereon. The molding flash will be located at the fused circular junction of the cover blanks and the parting line of the hemispherical molds. The molding flash will therefore be on the "equator" of the golf ball.

The molding flash and possible other imperfections projecting from the surface need to be removed and this is normally accomplished by one or a combination of the following: cutting blades, sanding belts, or grinding stones, and the like. These types of processes tend to enhance the obviousness of the seam. Alternative finishing processes have been developed to minimize this effect. These processes include tumbling with media, stiff brushes, cryogenic de-flashing and the like. Regardless of the finishing process, the result has been a flat parting line in an area substantially void of dimple coverage.

When flashing is removed by grinding, it is desirable that the molding operation be accomplished in such a manner that the molding flash is located solely on the surface of the golf ball and does not extend into any of the dimples. In other words, a grinding operation may have difficulty reaching into the dimples of the golf ball to remove the molding flash without ruining the golf ball cover. Therefore, prior art hemispherical molds are primarily fabricated so that the dimple-forming protrusions formed therein are set back from the circular rims, or mouths of their cavities. The result is that the equator of a molded golf ball is devoid of dimples and the molding flash is located solely on the smooth surface provided at the equator of the golf ball.

It is well known that the dimple pattern of a golf ball is a critical factor insofar as the flight characteristics of the ball are concerned. The dimples influence the lift, drag and flight stability of the golf ball. When a golf ball is struck properly, it will spin about a horizontal axis and the interaction between the dimples and the oncoming air stream will produce the desired lift, drag, and flight stability characteristics.

In order for a golf ball to achieve optimum flight consistency, its dimples must be arranged with multiple axes of symmetry. Otherwise, it might fly differently depending upon orientation. Most prior art golf balls include a single dimple free equatorial parting line, which inherently limits the number of symmetry axes to one. In order to achieve good flight consistency, it is often necessary to compensate for this limitation by adjusting the positions and/or dimensions and/or shapes of certain dimples.

For maximum performance and consistency, it is preferable to use a dimple arrangement that eliminates or hides the equatorial parting line, and it is best that it be done by including dimples that intersect the equator. Some U.S. patents that seek to place dimples upon the equator of the ball include U.S. Pat. Nos. 6,632,078 to Ogg et al., 6,200,232, 6,123,534 and 5,688,193 to Kasashima et al., 5,840,351 to Inoue et al., and 4,653,758 to Solheim. These patents introduced "stepped" and/or "zig zag" parting lines. While this could potentially improve compliance with the symmetry, they did not sufficiently improve dimple coverage, since the parting lines included straight segments that did not permit interdigitation of dimples from opposite sides of the equator. A stepped path often results in a greater loss of dimple coverage than a straight path because it discourages interdigitation for a larger number of dimples. U.S. Pat. No. 6,936,208 to Ogg teaches the formulation of a partial or continuous tab Therefore, a need exists for a mold to create a new and improved golf ball, one that would have a parting line configuration that would minimize dimple damage during flash removal, improve symmetry performance, increase dimple coverage, minimize the visual impact of the equator, and create a reduced amount of flash and the effort of removing it.

SUMMARY

The present invention is directed to a golf ball comprising a non-planar parting line on its spherical surface resulting from superimposing of a base waveform with at least one shorter wavelength secondary waveform. The base waveform being defined by a series of concentric arcs, wherein adjacent arcs have radii determined by their corresponding dimple diameters defined by the relationship $(1.005)D_{DIMPLE}/2 \leq r_{ARC} \leq (1.06)D_{DIMPLE}/2$. The adjacent arcs are connected with a straight line that is tangent to the arcs creating an acute angle $\alpha$ and the key inventive aspect is the line, which has its length defined by the relationship $L_{LINE}=(r_2+r_3)/\tan \alpha$, where the sum of the lengths of the straight lines are defined by the lengths of the arcs as $$(0.15)\Sigma L_{ARCS} \leq \Sigma L_{LINES} \leq (0.50)\Sigma L_{ARCS}$$

and the length of the shortest line segment in the parting line relates to the corresponding dimple pattern defined by $L_{MIN} \leq (0.05)D_{MIN}$. Further, the number of line segments, N, relates to the number of dimples, dn, lying predominantly in one hemisphere and abutting the parting lines as $N=2dn$.

The golf ball may have the dimple pattern of an iconsahedron-based pattern, an octahedral-based pattern, a cube-octahedral dimple pattern or a hexagonal dipyramid dimple pattern.

A plurality of gates (at least 8) are formed at positions substantially coincident with the highest and/or lowest points of the non-planar parting line.

In another embodiment of the patent, the parting line creates a wave amplitude not greater than 0.30 inches and preferably not greater than 0.015 inches from the ball equator.

It is imperative that the parting line length be less than ten percent greater than a great circle on the ball surface, and more preferably not greater than six percent.

A object of the invention is to have virtually all of the arcs concentric with the dimples

DETAILED DESCRIPTION OF THE INVENTION

Figure 1:
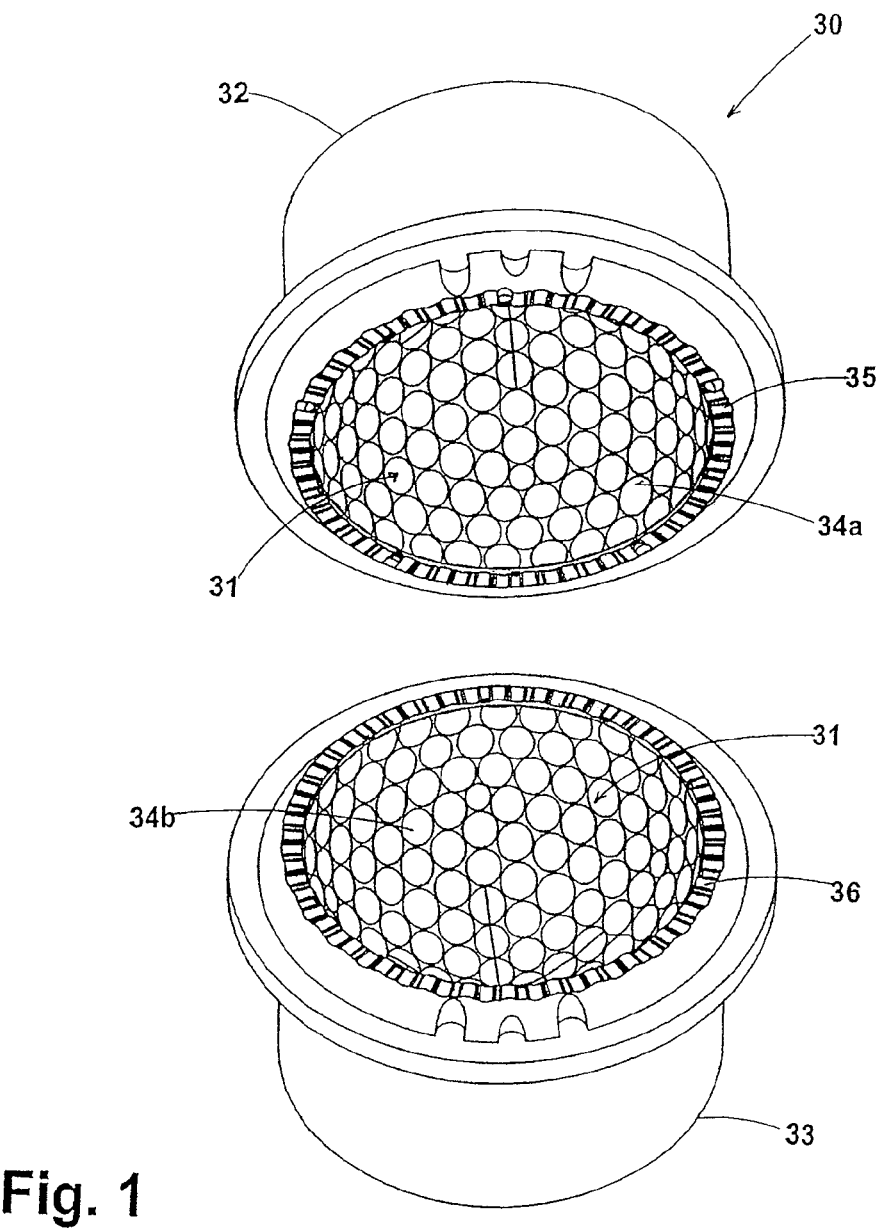
FIG. 1 is an enlarged pictorial expanded view of the mold comprising both mold halves showing the vents on the upper mold half.
Figure 2A:
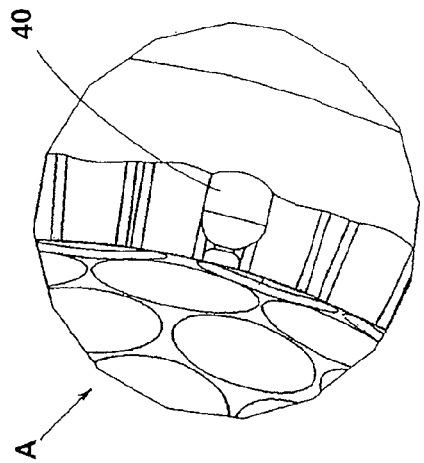
FIG. 2A is an enlarged view of A on FIG. 2.
Figure 2B:
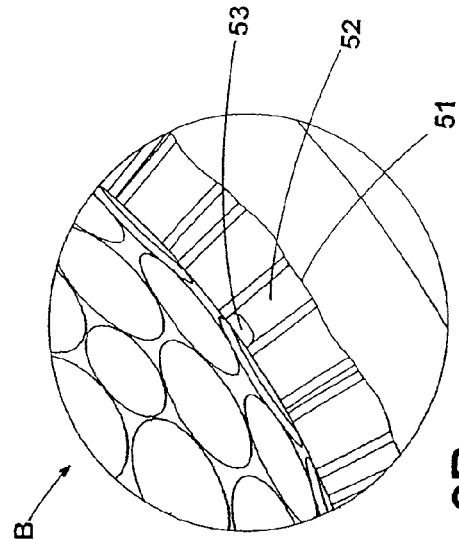
FIG. 2B is an enlarged view of B on FIG. 2.
Figure 2:
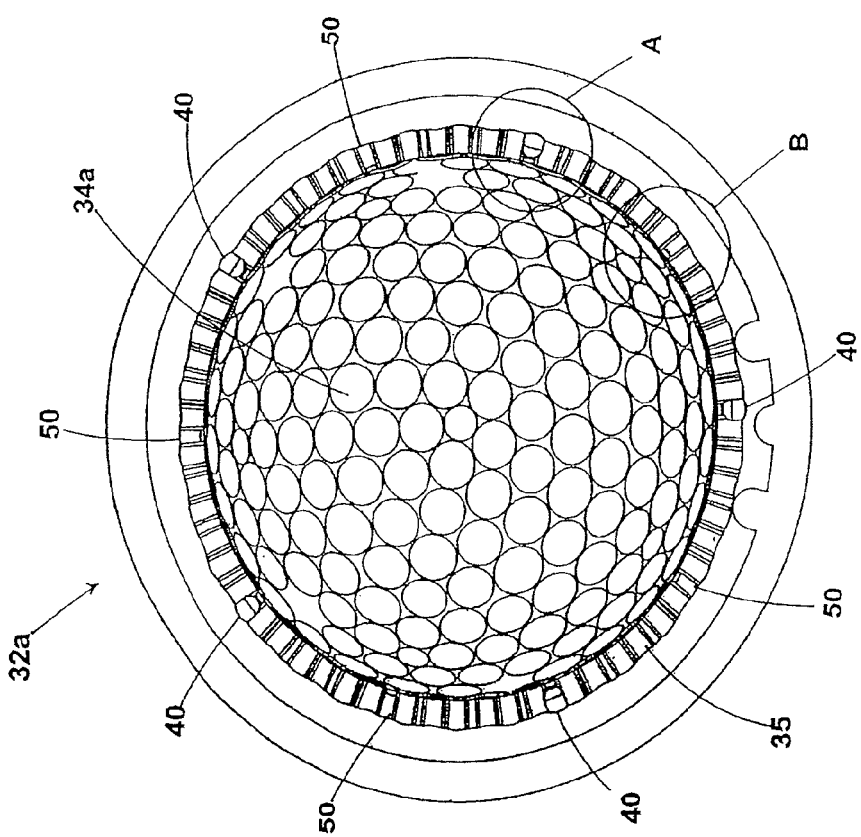
FIG. 2 is plan view of the upper mold half for a mold designed for a Urethane covered ball.
Figures 3, 3A:
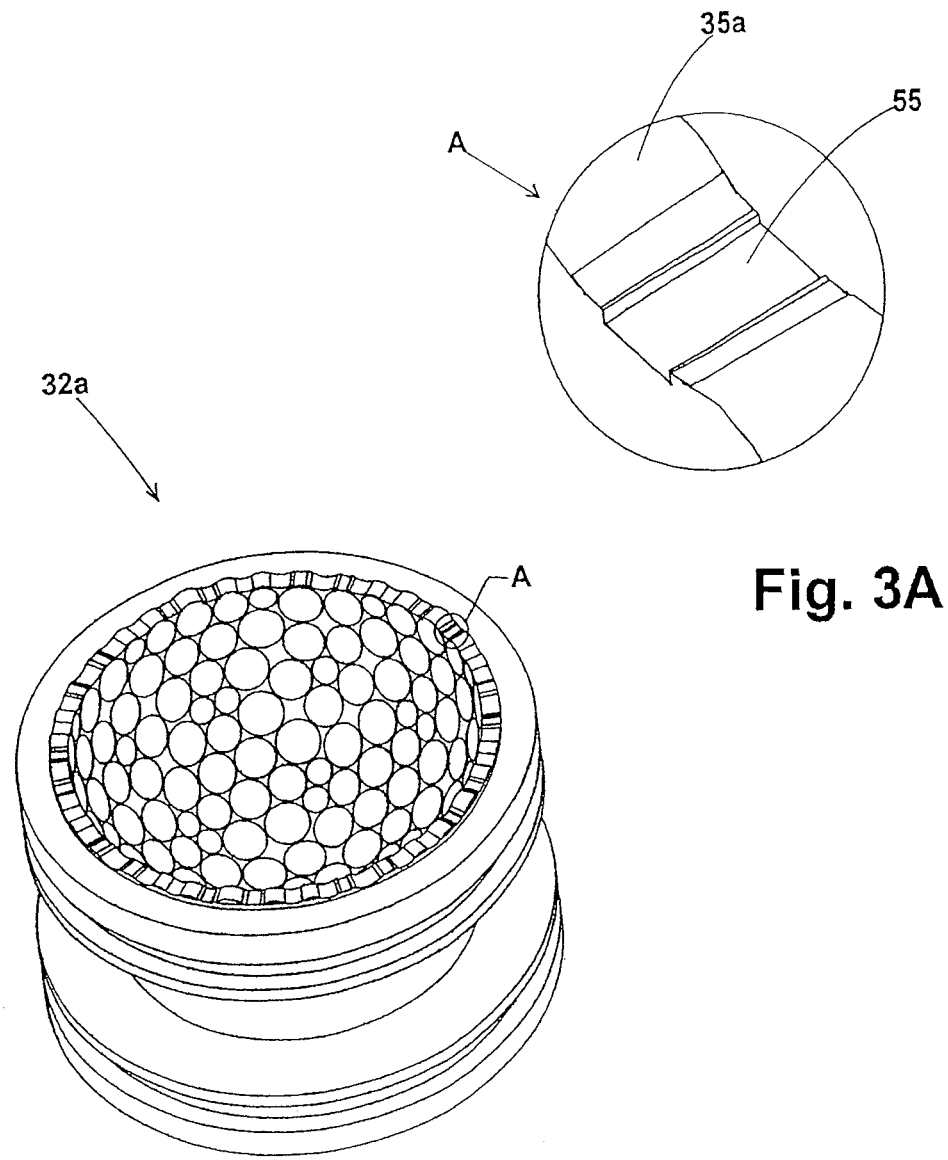
FIG. 3 is a pictorial view of an upper mold describing a vent designed for a Surlyn covered ball.
FIG. 3A is an enlarged view of A on FIG. 3.

Referring to FIGS. 1 to 4, wherein an improved mold is shown, with the mold being indicated by the reference numeral 30, the mold 30 having a spherical cavity 31 which is used to form a cover for a golf ball wherein the mold 30 comprises hemispherical mold halves, an upper mold half 32 and a lower mold half 33, both halves having interior dimple cavity details 34a and 34b respectively with the details of the upper mold half 34a shown in FIGS. 2, 2A and 2B, for a mold designed to form a castable cover over a core, and in FIGS. 3 and 3A, for a mold designed to form a cover made from Surlyn, and when these halves are mated they define a dimple arrangement therein. Any dimple arrangement, such as icosahedral, octahedral, cube-octahedral, dipyramid, and the like could be used. Although the preferred dimple is circular when viewed from above, the dimples may be oval, triangular, square, pentagonal, hexagonal, heptagonal, octagonal, etc. Possible cross-sectional shapes include, but are not limited to, circular arc, truncated cone, flattened trapezoid, and profiles defined by a parabolic curve, ellipse, semi-spherical curve, saucer-shaped curve, or sine curve. Other possible dimple designs include dimples within dimples and constant depth dimples. In addition, more than one shape or type of dimple may be used on a single ball, if desired.

Figure 4:
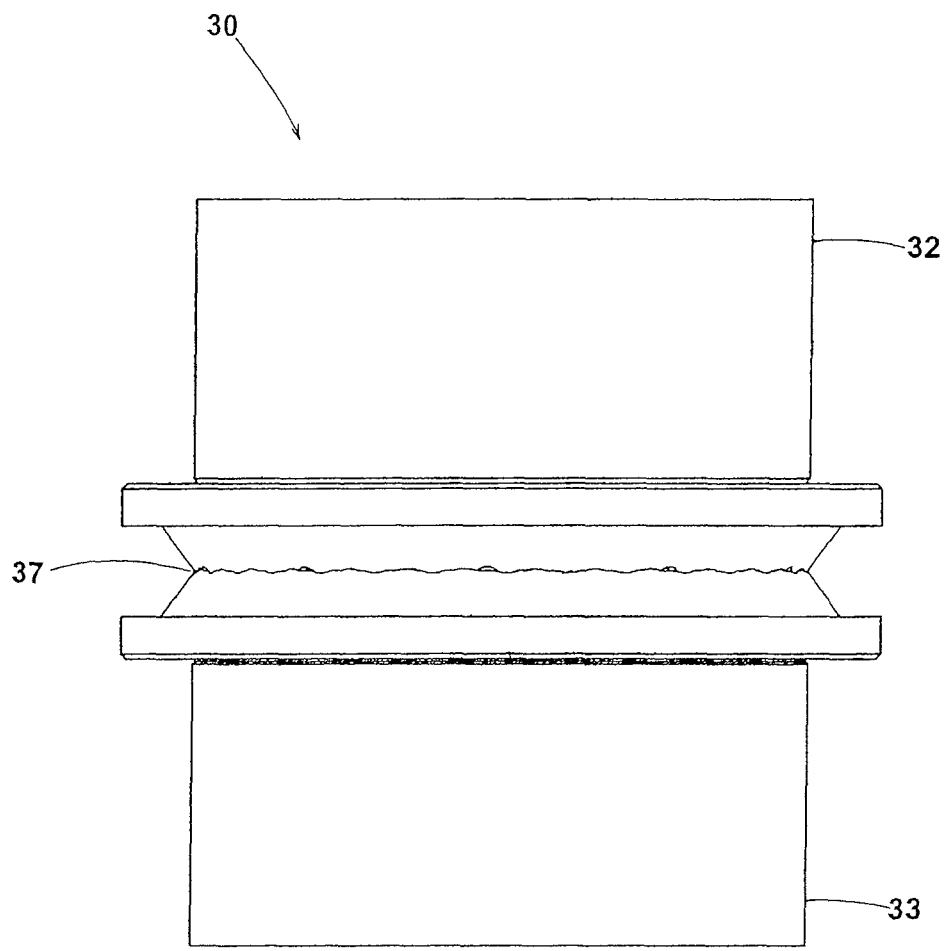
FIG. 4 is a pictorial view of a completed mold showing a non-planar parting line.

The upper and lower mold halves 32 and 33 have non-planar parting line surfaces 35 and 36 respectively, which are staggered as shown best in FIG. 4, each surface 35 and 36 comprising a plurality of peaks and valleys which are created by a method of defining, modeling, and manufacturing, by using a computerized modeling system as discussed below. When assembled the non-planar parting line 37 follows the dimple outline pattern and allows the dimples of one mold half to interdigitate with the dimples of the mating mold half, to form a golf ball of substantially seamless appearance.

The non-polar parting line 37 is machined to follow the profile of the equator dimples. Typically, the non-polar parting line 37, as it is machined, is offset from the equator dimples by at least 0.001 inch, as to not interfere with the dimple perimeter. This produces the wavy or corrugated formed parting line consisting of multiple peaks and valleys. Typically, the peaks (the highest point of the parting line) are located above the theoretical center of the cavity half and the valleys (the lowest point) are located below the theoretical center of the cavity half. This offset distance of the peaks and valleys can be as much as about half the dimple diameter or as little as 0.001 inch. Designs which incorporate as little as 0.001 inch offset, provide the benefit of interdigitating dimples, yet only producing a small amount of undercut in the cavity. This alternating geometry is consistent over the entire parting line surfaces of both mold halves 32 and 33.

The cavity design of the present invention can be applied for any golf ball molding process including injection molding, compression molding and casting. It will also work with the standard flat parting line as well as non-polar parting lines used to manufacture "seamless" golf balls.

The cavity design of the present invention incorporates the above method for creating the staggered rim definition necessary for the non-planar parting line 37 on the golf ball. The design principles as discussed below apply whether the ball has a Surlyn or a castable cover, such as urethane. However, as discussed above the molds have a differing construction depending upon the cover material.

Most "seamless" molding methods today define groups of dimples that traverse back and forth across the theoretical mid-plane of a non-planar parting line. The above described method of the present invention defines a method whereby the position of each dimple can be easily and individually defined (not as a group of dimples) thereby identifying the undulating surface of the cavity, regardless of the dimple pattern.

A concept of the improved mold is shown on FIGS. 2, 2A, and 2B, which illustrate the upper mold 32 having a mold surface 35 for mating with the lower mold 33 for creating castable covered balls. The non-planar parting line cavity design of the present invention incorporates the use of 3 or more equally spaced vents (sprues) and this depends on the dimple pattern. As shown, FIGS. 2, 2A, 2B depict five (5) true vents 40 and five (5) false vents 50. The design of the false vents 50 (FIG. 2B) is such that a small section of material (a "tab") is intentionally molded onto the ball and stays attached to the ball until the knifing process wherein they are removed. This tab is a result of the land area 51 having a partially dammed-up section 52 allowing for a relatively small recess 53 to fill with cover material therein creating the "tab". In addition to the false vents 50, this cavity design incorporates the use of five (5) true vents 40 which are depicted in detail in FIG. 2A. The true vents 40 function primarily to provide a vent for trapped air and/or excess material to pack around the core and flow out of the cavity as needed. As stated above, in the preferred embodiment only the upper mold 32 contains vents 40 and 50, however, it is to be appreciated that both molds 32 and 33 could contain vents 40 and 50 and still be within the scope of the invention.

FIGS. 3 and 3A depict an upper mold 32a for molding Surlyn as a cover material.

When molding Surlyn covers the mold does not contain false vents 50, but rather open vents 55 which extend across the entire mold surface 35a.

Regardless of whether the cover material is Surlyn, and therein formed by either compression molding or retractable pin molding, or whether it has a castable cover, such as urethane or urea, the resulting golf ball can have a "seamless" appearance.

The combination of three factors, first, a non-planar parting line, secondly, tabs molded and left behind from the real vents, and thirdly, the tabs that are molded in from the false vents, allows for a seamless ball to be oriented as it enters the buffing machine. When golf balls are spun on the orienting stations of the buffing machine, the molded-in tabs provide location of the actual buffing line. If alignment is not complete in a pre-determined amount of time, the ball will not be buffed and will be rejected as an un-buffed ball, which will require another pass through the machine at a later time. One of the key concepts of the present invention is the creation of the tabs that will minimize the amount of excess flash that must be removed therein saving both time and wasted material. The maximum amount of tab material needed to be removed will be held to less than 15% of the circumference. Another inherent advantage of the tabs as created by the present invention is that their removal can be done by a cutting knife which is a time saver over buffing or grinding off the flash.

The non-planar parting line of the above mold 30 is a result of incorporating into a mold a cavity design having a staggered rim definition (non-planar parting surface) which is created by using a computerized modeling system such as CAD (Computer Aided Design), CAE (Computer Aided Engineering), or similar type of system, along with a CNC machine tool. Preferably, the modeling system incorporates parametric 3-dimensional solid modeling capabilities that are required to properly manufacture and process Surlyn or castable covered golf balls which are often referred to as "seamless" golf balls.

Most dimple patterns incorporate repeating segments that are used to define the overall dimple arrangement. In such cases, it is only necessary to model a portion or portions of the golf ball or mold that are sufficient to define the entire golf ball or mold.

Molds with non-planar parting surfaces can be used to manufacture so-called "seamless" golf balls, in which the parting line on the molded product is not a great circle. Rather, it typically incorporates waveforms, steps, or other features that permit it to pass around and between interdigitated dimples without intersecting them. Once the parting line artifacts are removed through buffing and other finishing processes, the ball has a seamless appearance.

Figure 5:
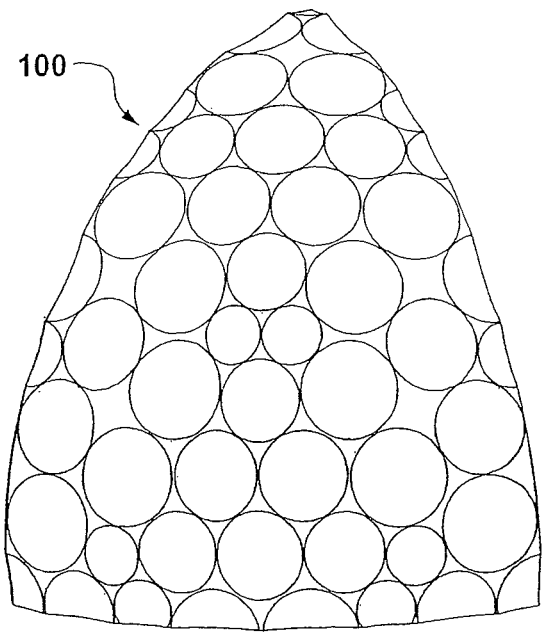
FIG. 5 is a golf ball segment model based upon the method of defining a parting surface of the present invention.

The method of the present invention utilizes six basic steps to achieve a seamless appearance. The steps are:

(1) Creating a 3-dimensional computer model representing the golf ball. The model may be constructed in many different ways that will depend on the particular system being used and the preferences of the designer constructing the model. It is generally preferred to work with the smallest ball segment that is sufficient to fully define the dimple pattern. FIG. 5 shows an example of a golf ball segment model 100.

Figure 6:
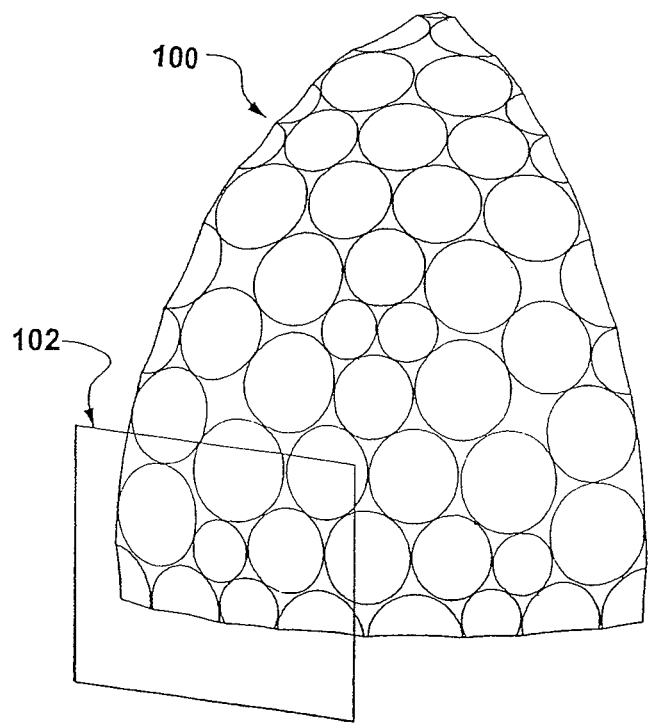
FIG. 6 is a golf ball segment illustrating a parting line profile construction plane.
Figure 7:
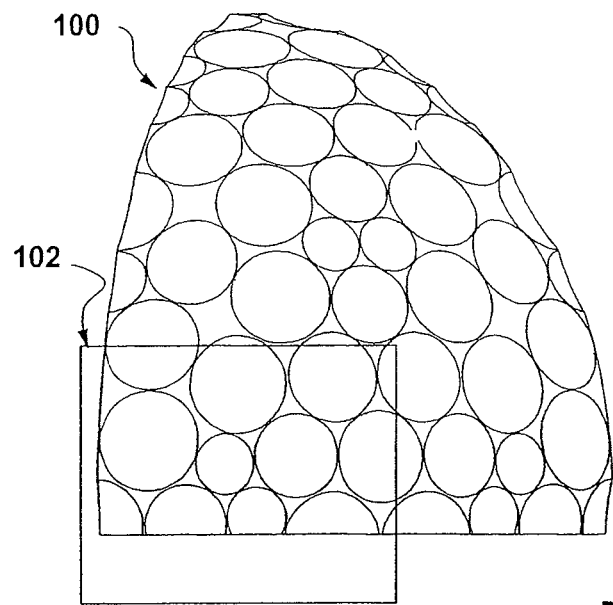
FIG. 7 is a view normal to the construction plane of FIG. 6.
Figure 8:
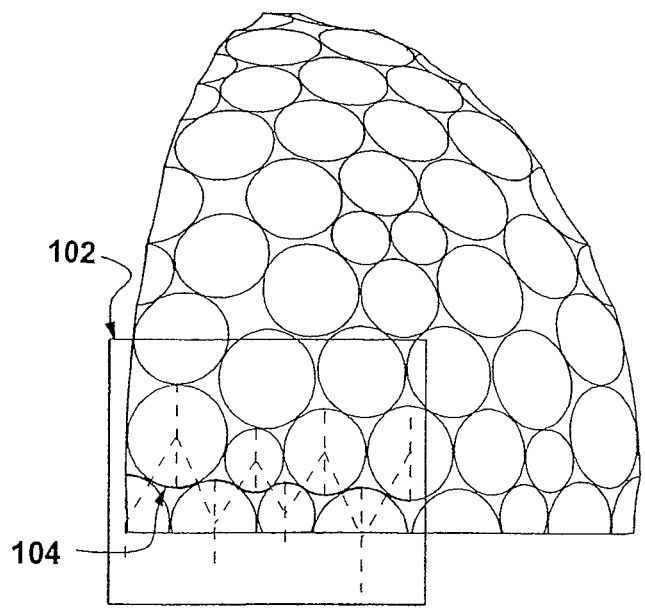
FIG. 8 illustrates arc segments that are constrained to be concentric with the neighboring dimples.

(2) Constructing a parting line profile plane as a 2-dimensional curve on a conveniently positioned plane. It is preferred to position the plane 102 parallel to the polar axis of the ball, at a distance that is greater than the radius of the ball. Such a plane is shown in FIG. 6. To construct a parting line profile 104, it is convenient to use a view direction that is normal to the plane, as shown in FIGS. 7 and 8, wherein the profile 104 can then be constructed of arc segments, line segments, or any other type of curve component that the particular system supports. Typically, the profile 104 will weave a path around and between dimples without intersecting them. It is very beneficial to define the profile geometry in a parametric fashion using references and constraints based on the dimple pattern geometry. For example, the profile 104 in FIG. 8 comprises arc segments that are constrained to be concentric with the neighboring dimples, with a radius parameter that is defined to be a particular value greater than the dimple radius. It is required that the curve segments be continuous with one another, and it is preferred that they be tangent as well wherever possible. In this example, because of mirror symmetry inherent in the dimple pattern, it is only necessary to create the parting line profile 104 for half of the ball segment shown.

Figure 9:
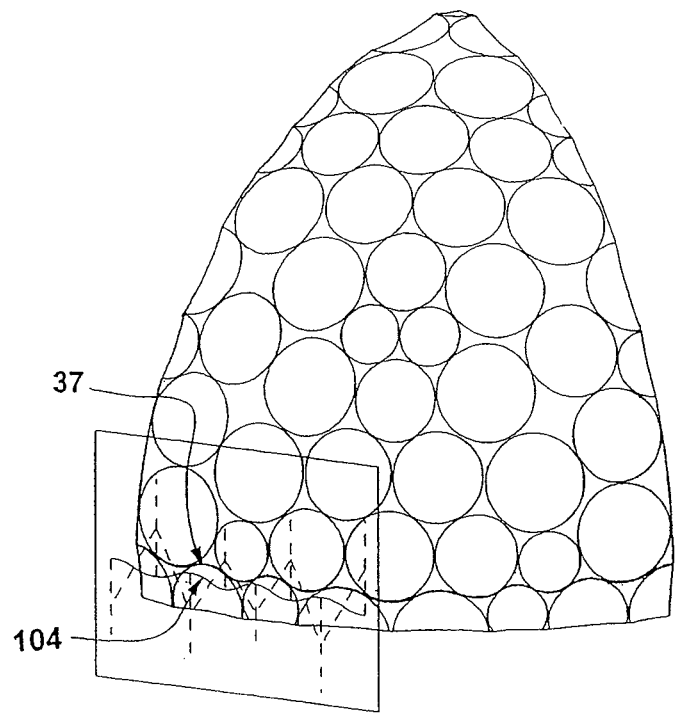
FIG. 9 projects the 2-dimensional parting line profile upon the surface of the ball to create a 3-dimensional parting line path.

(3) Creating the parting line 37 by projecting the parting line profile 104 onto the 3-dimensional surface of the golf ball model as shown in FIG. 9. The projection is performed along a direction chosen to properly position the parting line of the ball, which will typically be normal to the plane of the 2-dimensional parting line profile 104. In this case, the remaining half of the parting line is created as a mirror image.

Figure 10:
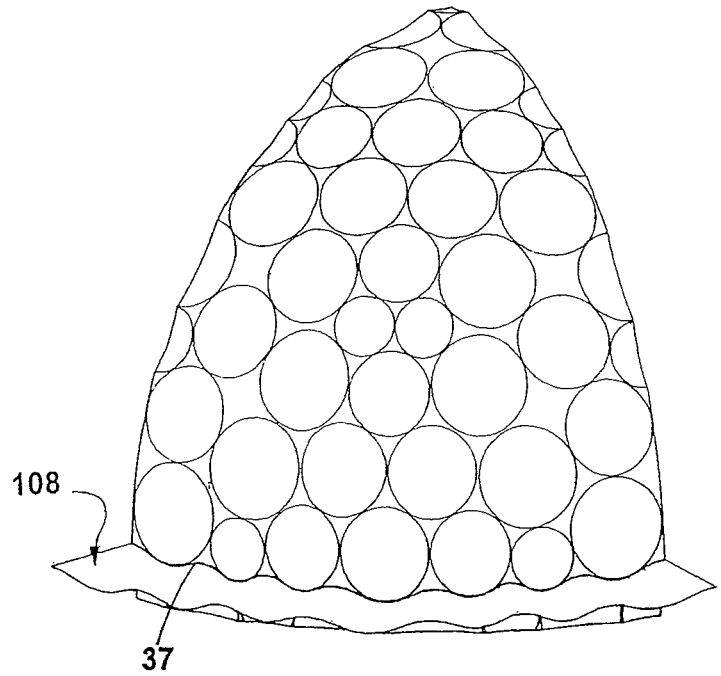
FIG. 10 utilizes the parting line path of FIG. 9 as a profile to generate a radiated geometry component to define the parting surface of the golf ball mold.
Figure 11:
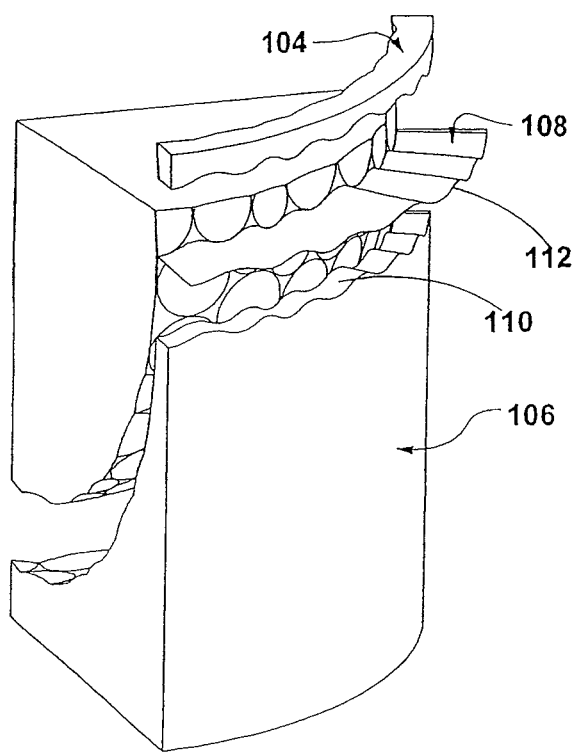
FIG. 11 is an exploded view to show how the radiated component of FIG. 10 is used to form the parting surface of a mold cavity model.

(4) Generating a radiated surface 108 containing the parting line 37 and defining the mold parting surface 110. As shown in FIGS. 10-11, the parting line path is used as a profile to generate a radiated geometry component 112 that defines the parting surface of the golf ball mold. Depending on the particular system being used and the preferences of the designer, the geometry component could be a radiated surface component 112 (as shown), or a radial extrusion solid component, or another type of radiated component. The radiated component 112 may be created as part of the golf ball model or as part of the mold model. It is preferred that the origin of the radiation is located along the polar axis of the ball or the mold cavity, and the direction of the radiation is parallel to the equator plane of the ball or mold cavity.

(5) Using the radiated surface 108 to form the parting surface of the golf ball mold. An example of an exploded view is shown on FIG. 11, wherein a cut operation can be performed using the radiated surface 108. The radiated surface 108 trims away waste material 104 along the edge of the mold, leaving the desired non-planar mold parting surface 110.

(6) Using the results of at least one of the steps 3-5 to manufacture the parting surface 110 of a golf ball mold 106. The parting surface of the golf ball mold is machined using the geometry created in the above steps. This is preferably accomplished using a CNC machine tool controlled by a program that was created directly from the model.

This method will enable a non-planar surface of any cavity to be easily defined regardless of dimple pattern.

In the manufacture of a golf ball, it is important that the parting surfaces of the molds mate very precisely. This minimizes the amount of flash and other parting line artifacts, which benefits the cosmetic quality of the finished golf ball, and it also produces greater uniformity and control over the size, weight, and roundness of the ball. Most golf ball molds employ a planar parting surface to easily provide a very precise mate. However, as previously discussed, the resulting great circle parting line on the molded ball introduces restrictions on dimple placement, which can affect the aerodynamic performance. This may manifest itself as reduced distance, reduced accuracy, or variations in performance depending on the orientation of the ball. Also, to some golfers the appearance of a great circle parting line free of dimples is not appealing.

The above embodiments utilize seamless parting lines that rely on connected arcs that are concentric to the dimples adjacent to the equator of the golf ball. While these continuous curve designed parting lines have many advantages, the machining tolerances are difficult to hold. The tight tolerances required can lead to variation in the wave among different mold halves, leading to additional flashing during the casting process. This can lead to a decrease in the buffing quality of the golf ball. Another embodiment of the invention effectively eliminates any distortions of the dimple perimeters during the CNC machining process by utilizing flat segments along the parting line.

As previously stated the specific number of cycles is dependent upon the underlying polyhedral geometry and superposition of waveforms which are functionally dependent on the dimple pattern layout, such as described in U.S. Pat. No. 7,618,333, which is incorporated herein, in its entirety, by express reference thereto. As a minimum the waveform consists of two waveforms having base and secondary wavelengths. Preferably, there are multiple secondary waveforms. The base waveform makes an integral number of cycles around the equator of the golf ball. For a ball having a tetrahedron pattern, the repeated sub-pattern is repeated two times on the ball hemisphere. Consequently, the base waveform will have a wavelength of ½ of the ball circumference. Similarly, icosahedron patterns commonly employ five segment repetitions. A functional description of a base waveform would be as follows:

$$\lambda_{base} = \frac{\pi D}{n}$$

Figure 12:
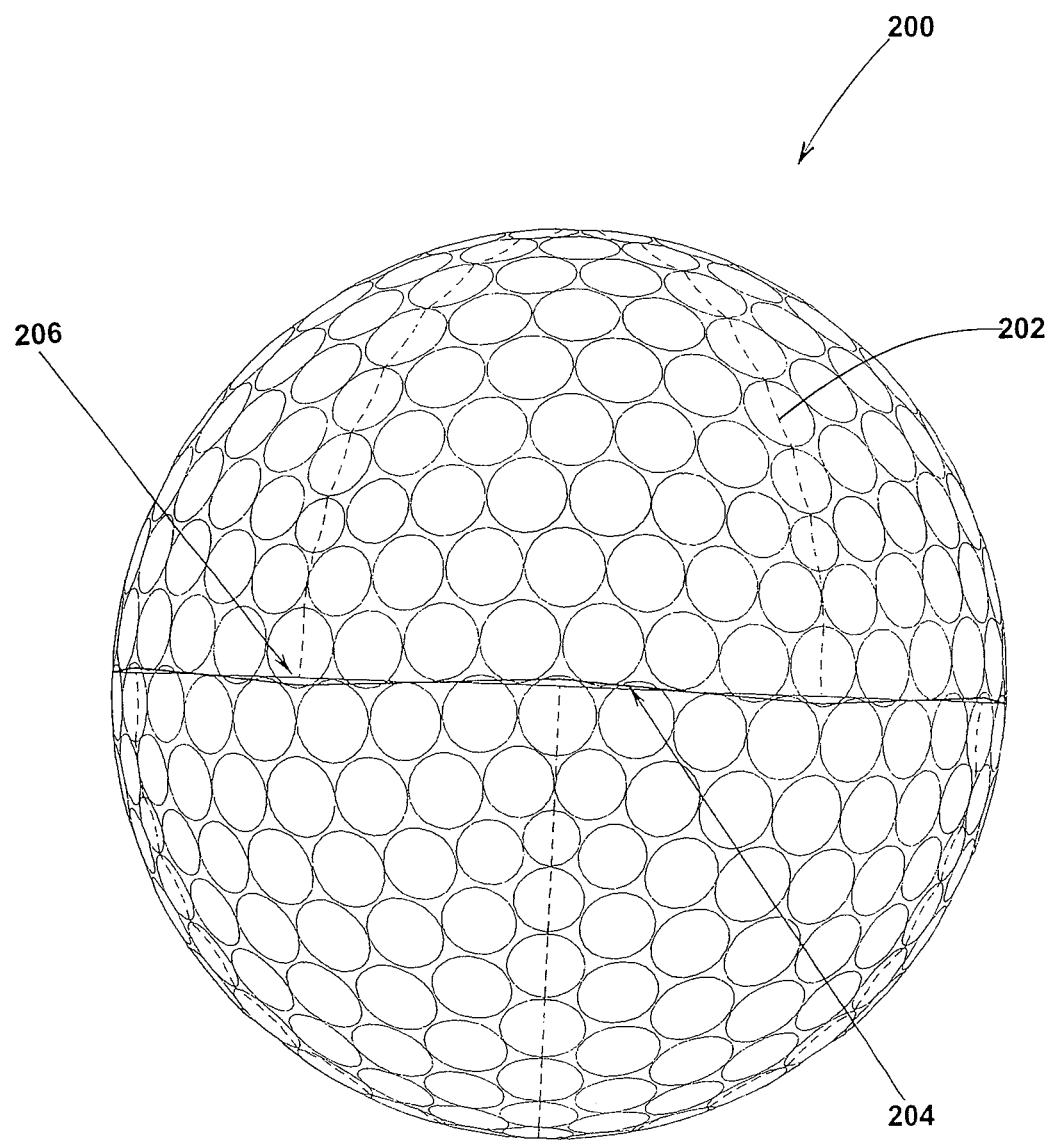
FIG. 12 is a symmetrical view of a golf ball having an icosahedron-based dimple pattern and illustrating a base waveform which is periodic, smooth, continuous and having an axis coincident with the ball equator.
Figure 13:
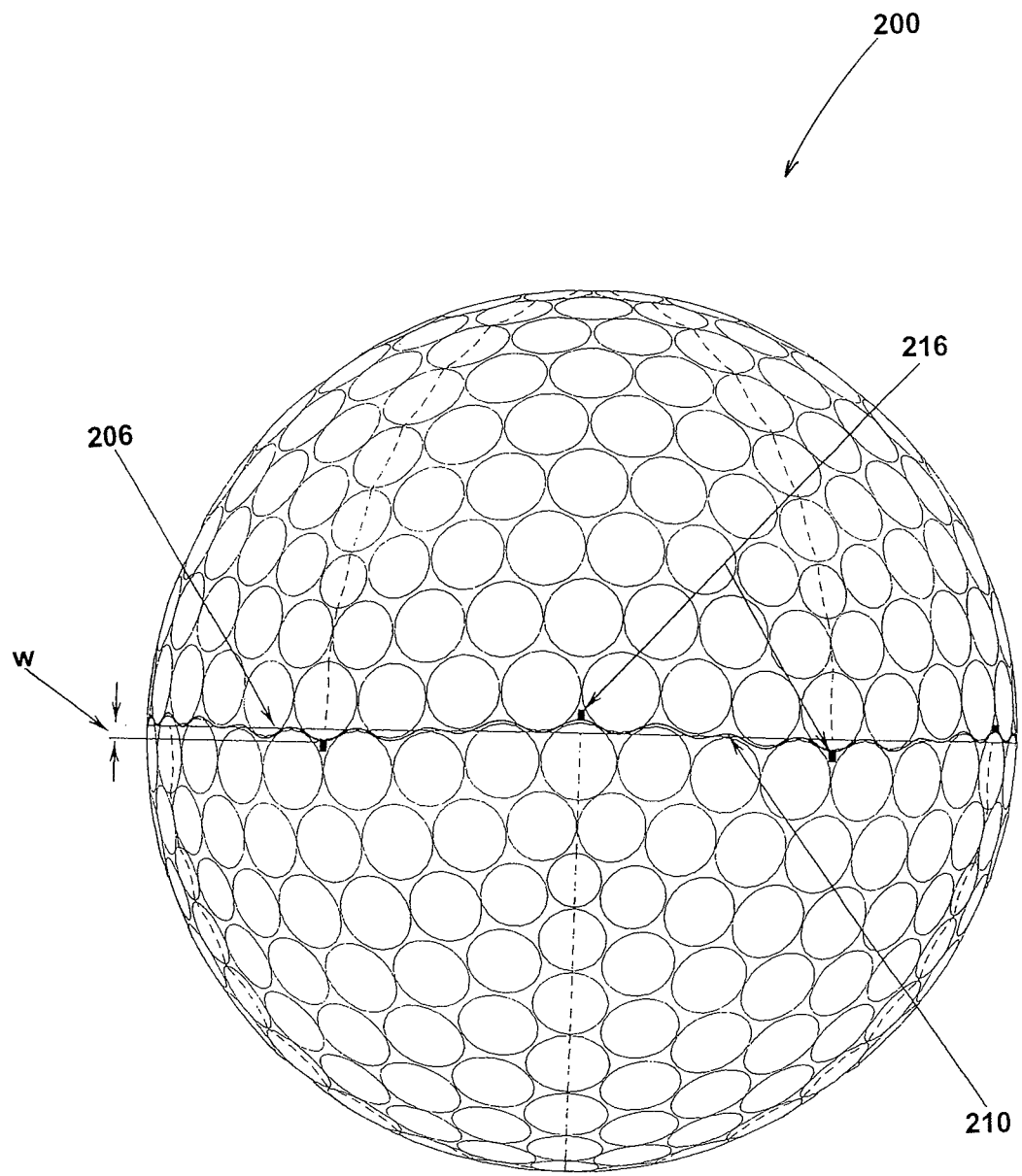
FIG. 13 is a symmetrical view of the golf ball of FIG. 2 with a secondary waveform superimposed upon the base waveform.

$\pi D$ is the ball circumference $n$ is the number of repeated pattern segments The golf ball 200 illustrated in FIGS. 12 and 13 illustrate this idea on an icosahedron-based pattern. The dashed lines 202 delineate the dimple pattern segments that repeat five times on each hemisphere. FIG. 12 illustrates a key concept of the invention, that being a base waveform 204 which is periodic, smooth, continuous and having an axis coincident with the ball equator 206. Further, dimples on opposing sides of the base waveform 204 are contained predominately in only one hemisphere. Clearly, a parting line defined only by the base waveform 204 shown in FIG. 12 would result in the intersection of at least some of the dimples. This would result in mold line defects which would be difficult to eliminate in the finishing operation. As stated, to resolve this issue a secondary waveform is superimposed upon the base waveform to create a final parting line 210 as seen in FIG. 13. The secondary waveform(s) have shorter wavelengths than the base waveform thereby allowing the final parting line configuration to maintain space from the dimple edges and avoid intersection dimples on opposing sides of the parting line. The secondary waveform(s) are primary defined by the individual dimples. The secondary wavelengths can be described in terms of the base wavelength in the following manner:

$$\lambda_{secondary} = \frac{\lambda_{base}}{i}$$

$i$ is the number of dimples per segment

FIG. 13 shows the completed parting line 210 configuration from the base waveform 202 in FIG. 12. The high degree of dimple interdigitation minimizes land area spacing along the parting line and gives a more uniform distribution of surface coverage for improved aerodynamic symmetry. This is achieved by a modest wave amplitude w. Wave amplitude w is understood to mean the maximum deviation of the final parting line waveform 210 from its horizontal axis, namely the equator. Preferably, the final wave amplitude is 0.30 inches or less. More preferably it is 0.015 inches or less. This requirement further limits the length of the parting line to be no more than 10% greater than that of a great circle on the ball surface. More preferably the length is 6% greater or less.

The points at which the wave amplitude is a maximum are important in the manufacturing role of the mold cavity. Preferably, a minimum of three maximum points occur per mold cavity. This is necessary for a high degree of manufacturing accuracy and minimum mold wave run out.

Figure 14:
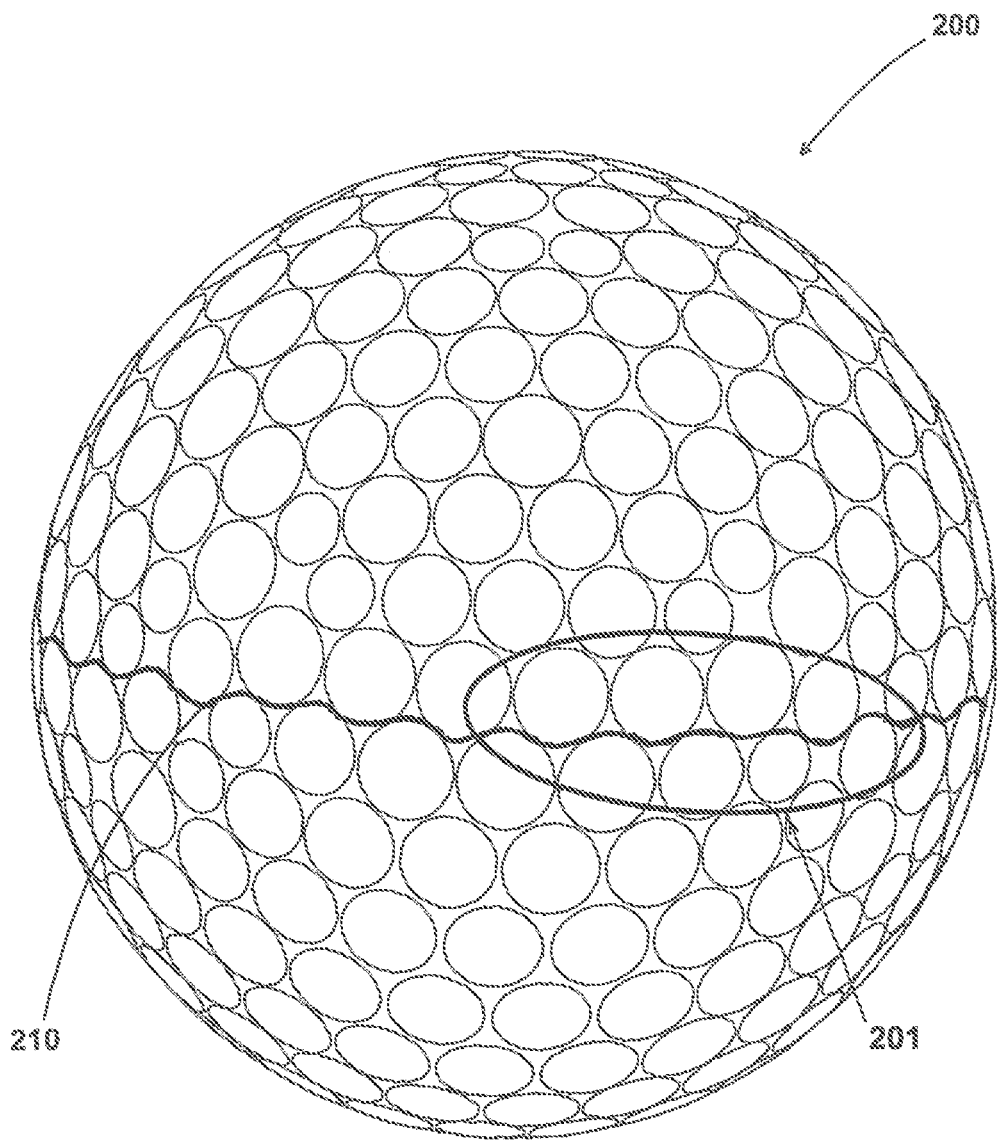
FIG. 14 is an enlarged detailed section of a final parting line configuration.
Figure 15:
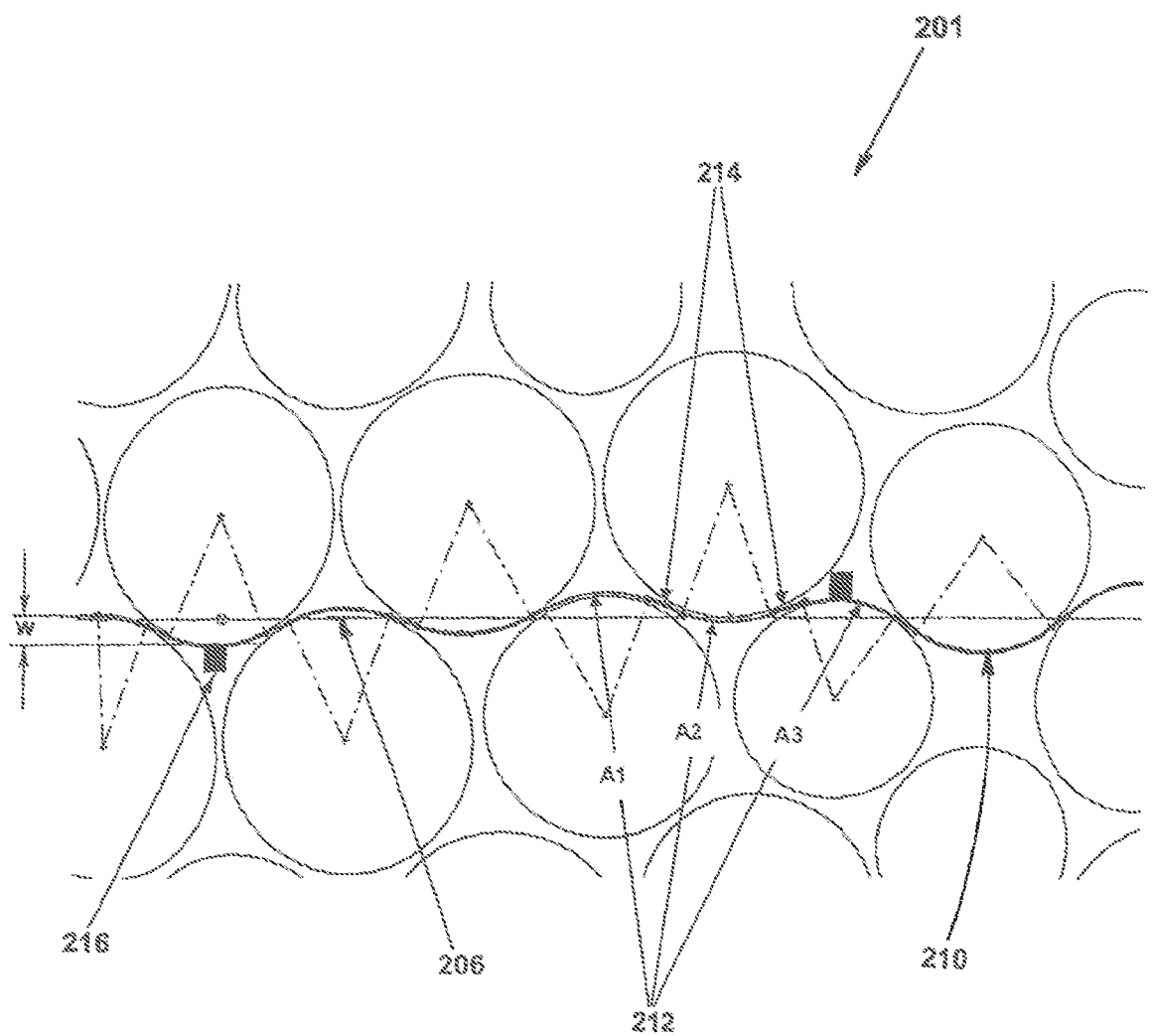
FIG. 15 is a schematic of the detail of FIG. 14 depicting the waveform of the present invention resulting from the mathematical equations involving tangent lines and arcs.
Figure 16:
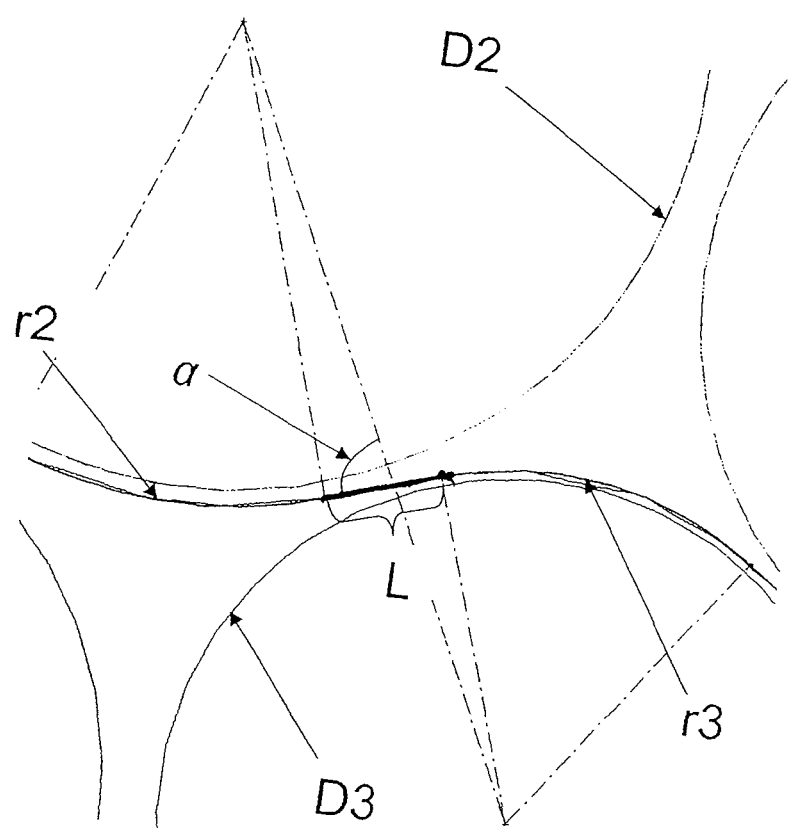
FIG. 16 is a schematic depicting the employment of straight lines tangent to the dimple arcs.

The development of the secondary waveform is described using a tetrahedral based layout like that in FIGS. 14 to 16. FIG. 14 shows a detailed section 201 of a final parting line configuration. The parting line 210 is created by first making a series of arcs 212 that follow the dimple layout. The majority of these arcs 212 should be concentric with the dimples. Preferably, a minimum of 80% of the arcs are concentric with the dimples they follow on the parting line 210. More preferably, at least 90% of the arcs are concentric. Most preferably, all of the arcs 212 are concentric with the dimples they follow. The radii of the concentric arcs 212 are shown as $A_1$, $A_2$, and $A_3$ and they would relate to their shared dimple diameters as follows:

$$(1.005)\frac{D_{DIMPLE}}{2} \le r_{ARC} \le (1.06)\frac{D_{DIMPLE}}{2}$$

Adjacent arcs $A_2$ and $A_3$, shown in FIG. 15, are connected with a straight line 214 that is tangent to both arcs. A closer detail is shown in FIG. 16. By drawing a straight line connecting the centers of the dimples $D_2$ and $D_3$, we can determine an acute angle alpha ($\alpha$). The following functional relationship between $r_2$, $r_3$, and $\alpha$ is satisfied to calculate the length ($L_{LINE}$) of the line tangent to both arcs:

$$L_{LINE} = \left(\frac{r_2 + r_3}{\tan\alpha}\right)$$

This type of parting line design has been shown to be an improvement over the alternate method, in both accuracy and repeatability. However, if the flat segments are too large these benefits can be diminished. Therefore, the sum of the lengths of the arcs 212 on the parting line should relate to the sum of the lengths of the straight lines 214 as follows:

$$(0.15)\Sigma L_{ARCS} \le \Sigma L_{LINES} \le (0.50)\Sigma L_{ARCS}$$

Where the length of the shortest line segment in the parting line ($L_{MIN}$) should relate to the corresponding dimple pattern and the smallest dimple diameter in the pattern, $D_{MIN}$, as such:

$$L_{MIN} \le (0.05) D_{MIN}$$

Further, the number of line segments, N, relates to the number of dimples, n, lying predominantly in one hemisphere and abutting the parting line as:

$$N=2n$$

Another embodiment of the inventive design is the position of the gates 216 shown as small square blocks at local maxima on the parting line curve 210. These gates 216 are visible on the molded golf ball as small tabs. Gates 216 are positioned on either side of the parting line. Their location and shape are designed to assure that a molded ball can be finished utilizing existing methods with only slight machine modification. As a minimum eight (8) gates 216 are required per molded ball hemisphere. Preferred gate dimensions, locations and count are dependent upon the dimple pattern.

It is appreciated that numerous modifications and other embodiments may be devised by those skilled in the art. Therefore, it will be understood that the appended claims are intended to cover all modifications and embodiments, which would come within the spirit and scope of the present invention.

The dimple patterns of the present invention can be used with any type of golf ball with any playing characteristics. For example, the dimple pattern can be used with conventional golf balls, solid or wound. These balls typically have at least one core layer and at least one cover layer. Wound balls typically have a spherical solid rubber or liquid filled center with a tensioned elastomeric thread wound thereon. Wound balls typically travel a shorter distance, however, when struck as compared to a two piece ball. The cores of solid balls are generally formed of a polybutadiene composition. In addition to one-piece cores, solid cores can also contain a number of layers, such as in a dual core golf ball. Covers, for solid or wound balls, are generally formed of ionomer resins, balata, or polyurethane, and can consist of a single layer or include a plurality of layers and, optionally, at least one intermediate layer disposed about the core.

All of the patents and patent applications mentioned herein by number are incorporated by reference in their entireties.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. For example, while the preferred dimple sizes have been provided above, dimples of other sizes could also be used. Thus the present invention should not be limited by the above-described exemplary embodiments, but should be defined only in accordance with the following claims and their equivalents.

We claim as our invention:

1. A golf ball having a non-planar parting line on its spherical surface, the golf ball comprising:
   a non-planar parting line resulting from superimposing of a base waveform with at least one shorter wavelength secondary waveform;
   the secondary waveform defined by a series of concentric arcs, wherein the arcs have radii determined by corresponding dimples, the dimples having diameters defined by the relationship $(1.005)D_{DIMPLE}/2 - r_{arc} - (1.06) D_{DIMPLE}/2$;
   adjacent arcs being connected with a straight line that is tangent to the arcs creating an acute angle $\alpha$;
   the length of the straight line defined by $L_{LINE}=(r_2+r_3)/\tan\alpha$;
   the sum of the lengths of the straight lines are defined by the lengths of the arcs as $$(0.15)\Sigma L_{ARCS} \le \Sigma L_{LINES} \le (0.50)\Sigma L_{ARCS};$$

and the length of the shortest line segment in the parting line relates to the corresponding dimple diameters defined by $L_{MIN} > (0.05) D_{MIN}$.

2. The golf ball according to claim 1, wherein the dimples are arranged in an icosahedron-based dimple pattern.

3. The golf ball according to claim 1, wherein the dimples are arranged in a dodecahedron-based dimple pattern.

4. The golf ball according to claim 1, wherein the dimples are arranged in a pentagonal dipyramid-based dimple pattern.

5. The golf ball according to claim 1, wherein the dimples are arranged in a triangular dipyramid-based dimple pattern.

6. The golf ball according to claim 1, wherein the dimples are arranged in a tetrahedron-based dimple pattern.

7. The golf ball according to claim 1, wherein the dimples are arranged in an icosidodecahedron-based dimple pattern.

8. The golf ball according to claim 1, wherein the dimples are arranged in octahedral-based dimple pattern.

9. The golf ball according to claim 1, wherein the dimples are arranged in a cube-octahedral dimple pattern.

10. The golf ball according to claim 1, wherein the dimples are arranged in a hexagonal dipyramid dimple pattern.

11. The golf ball according to claim 1, wherein a plurality of gates are formed at positions substantially coincident with the highest and/or lowest points of the non-planar parting line.

12. The golf ball according to claim 11, wherein the plurality of gates is at least 8.

13. The golf ball according to claim 1, wherein the spherical surface is a cover formed from a urethane or a urea material.

14. The golf ball according to claim 1, wherein the parting line creates a wave amplitude not greater than 0.30 inch.

15. The golf ball according to claim 14, wherein the wave amplitude is 0.015 inch or less.

16. The golf ball according to claim 15, wherein points of maximum amplitude are at least three.

17. The golf ball according to claim 1, wherein the parting line is less than ten percent greater than a circumference of the ball.

18. The golf ball according to claim 17, wherein the parting line is less than six percent greater than the circumference of the ball.

19. The golf ball according to claim 1, wherein the minimum number of arcs concentric with the corresponding dimples is 80 percent.

20. The golf ball according to claim 19, wherein the minimum number of arcs concentric with the corresponding dimples is 100 percent.

21. A golf ball having a non-planar parting line on its spherical surface, the golf ball comprising:

a non-planar parting line resulting from a superposition of at least two waveforms, a base and secondary, with the secondary having a functional relationship to the base defined as $$\lambda_{SECONDARY} = \frac{\lambda_{BASE}}{i};$$

the secondary waveform defined by a series of concentric arcs, wherein adjacent arcs have radii determined by corresponding dimples, the dimples having diameters defined as $$(1.005)\frac{D_{DIMPLE}}{2} \leq r_{ARC} \leq (1.06)\frac{D_{DIMPLE}}{2};$$

the adjacent arcs being connected with a straight line segment that is tangent to the arcs creating an acute angle, $\alpha$;

the length of the straight line segment defined as $L_{LINE} = (r_2+r_3)/\tan \alpha$; and the number of straight line segments being equal to the number of dimples adjacent to the secondary waveform.

22. The golf ball according to claim 21, wherein the dimples are arranged in an icosahedron, or dodecahedron, or dipyramid, or triangular dipyramid, or tetrahedron, or icosidodecahedron, or octahedral, or hexagonal dipyramid-based dimple pattern.

23. The golf ball according to claim 21, wherein a plurality of gates are formed at positions substantially coincident with the highest and/or lowest points of the non-planar parting line.

24. The golf ball according to claim 21, wherein the parting line creates a wave amplitude not greater than 0.30 inch.

25. The golf ball according to claim 24, wherein the wave amplitude is 0.015 inch or less.

26. The golf ball according to claim 21, wherein the non-planar parting line is less than ten percent greater than a circumference on the ball surface.

27. The golf ball according to claim 26, wherein the non-planar parting line is less than six percent greater than the circumference on the ball surface.

28. The golf ball according to claim 21, wherein the minimum number of arcs concentric with the dimples is 80 percent.

29. The golf ball according to claim 28, wherein the minimum number of arcs concentric with the dimples is 100 percent.

* * * * *